United States Patent Office 3,697,255
Patented Oct. 10, 1972

3,697,255
SCRAP TANTALUM RECLAMATION PROCESS
Wiley M. Baldwin, Winston-Salem, N.C., and Edward O. Fuchs, Union, Donald J. Sharp, Trenton, and James H. Swisher, Stirling, N.J.; said Baldwin and said Sharp assignors to Western Electric Company, Incorporated, New York, N.Y., said Fuchs and said Swisher assignors to Bell Telephone Laboratories, Incorporated, Berkeley Heights, N.J.
Filed Nov. 17, 1970, Ser. No. 90,250
Int. Cl. C22b 7/00, 51/00; C22c 1/06
U.S. Cl. 75—.5 AB  16 Claims

ABSTRACT OF THE DISCLOSURE

Scrap tantalum bodies having impurities therein are reclaimed as substantially pure tantalum metal by a process which includes immersing the bodies in a molten metal such as calcium or magnesium at elevated temperatures, and under non-oxidizing conditions for a prolonged period of time sufficient to cause entrapped impurities within the body to diffuse out and react with the molten metal.

BACKGROUND OF THE INVENTION (1) Field of the invention

This invention is directed to the recovery of tantalum metal from a scrap tantalum body, and is particularly concerned with a process for reclaiming a tantalum metal that has a high purity (e.g., a purity equivalent or better than commercially available sources) from rejected tantalum capacitors.

In the manufacture of tantalum capacitors, the properties of the tantalum metal are very critical to production. These properties are strongly dependent on the concentration of interstitial impurities within the metal, itself. Presently, there are sources available which supply tantalum metal commercially that meet the critical property requirements to manufacture suitable capacitors. However, these sources are limited. Moreover, tantalum is commonly considered as one of the critical metals whose source is being depleted in the environment. This is attested to in a recent article, B. D. Wakefield, U.S. Heads for the Mineral Poorhouse, Iron Age, June 4, 1970, pps. 71–76. Because of this trend, it is becoming necessary to salvage scrap tantalum by-products to meet production demands.

(2) Problems in the prior art

In the processing of scrap tantalum products (e.g., rejected tantalum capacitors) for recovery into a suitable tantalum metal to fabricate new capacitors, there are a number of essential operations to be performed. These operations have proven to be quite complex. For example, a rejected tantalum capacitor includes a tantalum metal body which has a first overlying anodic film of tantalum oxide and a second overlying counter-electrode film consisting of layers of manganese oxide, graphite and silver. The composite body also has soldered metal leads extending axially therefrom, and is further encapsulated with an epoxy based composition. In addition, excess oxygen is interstitially entrapped within the tantalum body because oxygen readily diffuses through the encapsulator and into the open pores of the tantalum body when the capacitor is in use. The diffused oxygen affects the electrical leakage properties of the capacitor to the point where the capacitor is no longer serviceable. To recover the tantalum, obviously, the encapsulator, and metal finishing must be separated from the tantalum body. Further, the overlying films which are now impaired by delineation and other imperfections no longer possess the necessary electrical properties required in a newly formed capacitor, and they have to be removed. Moreover, in order to produce a suitable high purity tantalum metal which can be used in the fabrication of a new tantalum capacitor, it is necessary to reduce the content of entrapped oxygen in the tantalum body to a minimal level.

The encapsulator, metal finishings and overlying films are generally removed in a step-by-step operation employing physical and chemical techniques that are regarded as well known in the art. However, it has proven very difficult to remove the entrapped oxygen from the tantalum body to a level which would be suitable for manufacturing new tantalum capacitors.

A known technique for removing the entrapped oxygen includes reacting carbon powder with the powder of a tantalum metal body to be processed. This reaction causes the entrapped oxygen to react with the carbon if the carbon is stoichiometrically mixed with the tantalum powder. While this process is effective for producing satisfactory high purity tantalum powders, extreme control of the amount of carbon employed must be maintained during this reaction. Too little carbon will not be sufficient to react all the oxygen in the tantalum, and too much carbon will result in excess carbon mixed with the tantalum metal. Carbon cannot be removed from the metal unless it is converted to a volatile constituent and carbon is another impurity that is undesirable in the tantalum metal. Moreover, the tantalum body must be ground into a powder before it can be mixed with the carbon. Because of these complexities this technique demands extreme control precautions and these precautions negate many of the advantages in recovering acceptable tantalum for manufacturing capacitors. For instance, in U.S. Pat. 3,415,639, issued Dec. 10, 1968, to Daendliker et al., a process is disclosed for reclaiming a purified tantalum powder, suitable for making anodes, from a tantalum oxide source which also has a high content of entrapped oxygen. The tantalum oxide is first treated with highly reactive metals, such as calcium or magnesium, to reduce the oxide. These metals react very rapidly to reduce the oxide to tantalum and the chemical thermodynamics of their reactions are well known in the art. The powder is then further treated with carbon in the aforedescribed manner to remove the entrapped oxygen therefrom. Needless to note, the disadvantages in this process are the same as previously mentioned.

SUMMARY OF THE INVENTION

This invention is attained by the discovery that a rejected tantalum body having entrapped oxygen within can be treated by a relatively simple procedure to remove most of the entrapped oxygen. Furthermore, extensive quality control measures need not be taken.

Briefly, the tantalum body is reacted with a high purity molten metal selected from the group consisting of calcium, magnesium, and mixtures thereof at elevated temperatures in a non-oxidizing atmosphere for a prolonged period of time exceeding the ordinary reaction period.

It is surprisingly noted that the entrapped oxygen within the tantalum body diffuses to the surface of the body in the presence of a non-oxidizing atmosphere and also reacts with the molten metal until substantially complete de-oxidation of the tantalum body occurs. A reaction film is formed on the surface of the body, but this film does not impede prolonged reaction of the diffused oxygen because the film is discontinuous, therefore quite porous, permitting the oxygen to diffuse therethrough. Furthermore, it is surprisingly noted that during a prolonged period the molten metal does not react with the tantalum nor does it diffuse therein in the presence of a non-oxidizing atmosphere even though it is in intimate contact with the body. Therefore, excess amounts of molten metal may be employed without danger of contaminating the de-oxidized tantalum body. By excess, it is meant that amounts of molten metal greater than the stoichiometric amount required to react with the diffused oxygen may be employed. The oxide of the molten metal, which is formed as a result of the reaction between the metal and the diffused oxygen and any excess molten metal are easily dissolved from the surface of the de-oxidized tantalum metal body with a suitable inorganic solvent which is inert to the tantalum.

With this improved technique the tantalum body need not be pulverized during the de-oxidization, unless it is desired to do so.

DESCRIPTION OF THE DRAWING

The aforementioned and other objects of the invention will become apparent from the following detailed description of specific embodiments thereof when read in conjunction with the appended drawing in which.

DETAILED DESCRIPTION OF THE PREFERRED EMBODIMENTS

Figure 1:
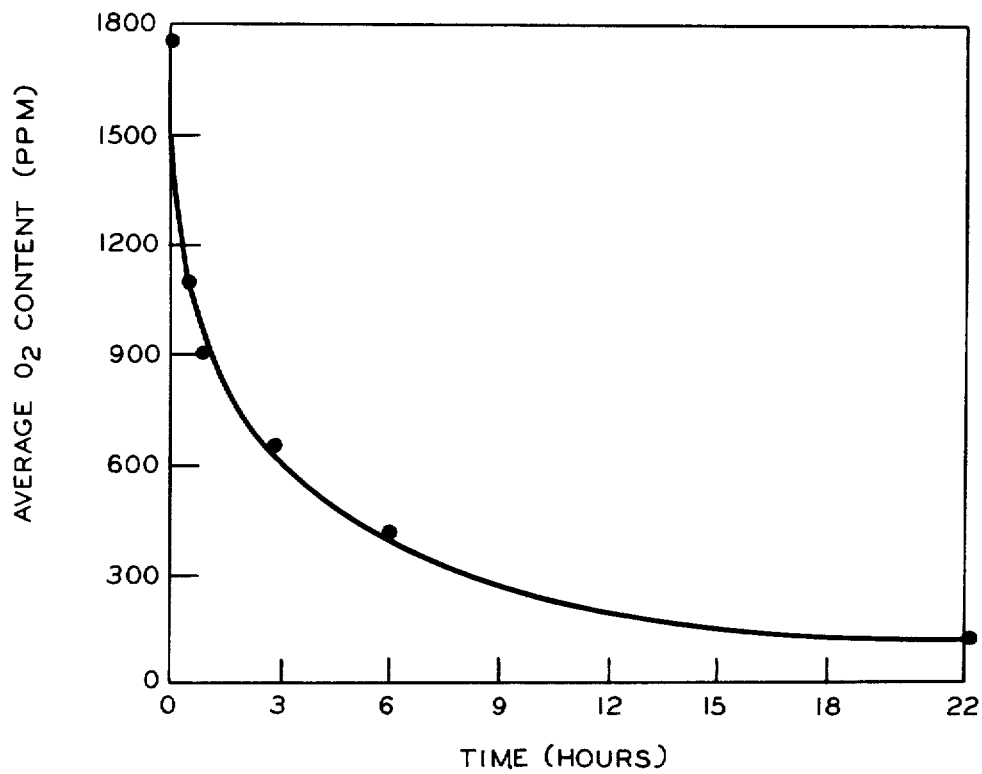
FIG. 1 is a graphic plot illustrating the rate of diffusion of entrapped oxygen to the surface of a tantalum body over a period of time.

In one illustrative embodiment, a tantalum body having an entrapped oxygen content in the range of 1700–6600 p.p.m. within, is immersed in high purity molten calcium, magnesium, or mixtures thereof at an elevated temperature in a helium atmosphere for a prolonged duration. At this elevated temperature, the entrapped oxygen which exists in an atomic state in the tantalum body progressively diffuses to the surface thereof and over a period of time reacts with the molten metal to form an oxide of the metal. This reaction is represented as follows:

O (atomic oxygen in solution) +X (molten metal→XO (metal oxide). The reaction is continued, as aforementioned, until substantially all of the oxygen diffuses to the surface and reacts with the molten metal. The suitable time and temperature ranges depend upon the specific reducing metal employed, and the amount of oxygen entrapped in the tantalum body. Upon completion of the deoxidizing of the tantalum body, the body is immersed in an inorganic solvent (e.g., a dilute acid), that dissolves out the metal oxide reaction product and any excess molten metal present. The end product is a substantially pure de-oxidized tantalum body, having an oxygen content in the range of 100–1200 p.p.m. This range is sufficiently low for manufacturing tantalum anodes having the necessary electrical properties.

In a second illustrative embodiment of the invention, a similar tantalum body is immersed in the molten metal described in the first embodiment. However, in this embodiment, a hydrogen atmosphere at approximately the same temperatures is employed. When the hydrogen atmosphere is employed, the hydrogen diffuses through the molten metal to the tantalum body embrittling the body to a hydrogenated state. The entrapped oxygen diffuses to the surface of the body as described in the first embodiment and reacts with the molten metal to form metal oxide. After removal of the metal oxide from the body, as described previously, the body in the embrittled state is ground into a powder and dehydrogenated by subjecting it to helium atmosphere at elevated temperatures. The finished body is a high purity de-oxidized tantalum body equivalent in purity to that of the tantalum body described in the first embodiment.

Without limiting the generality of the foregoing description, the following examples are presented to illustrate the properties obtainable with the method embodying the invention.

EXAMPLE 1

Six sets of tantalum rods, 0.48 cm. diameter x 2 cm. long were prepared by doping the tantalum rods with oxygen in a two-step treatment. First, the surfaces of the rods were oxidized in a four hour treatment at 800° C. in an atmosphere of wet hydrogen. The rods were then homogenized by annealing in an evacuated quartz capsule for 24 hours at 1000° C. The rods were then sectioned and resulting specimens were found to be uniform in hardness across their diameters. The first set of rod specimens were analyzed for oxygen content and they averaged approximately 1800 p.p.m. of entrapped oxygen. The amount of oxygen was determined by inert gas fusion analysis.

The rod specimens of the remaining five sets were immersed in 99.9% molten calcium (obtained commercially from United Mineral and Chemical Corp.) in a helium atmosphere for varying durations ranging from 30 minutes to 22 hours. (It is important to employ high purity calcium because it is found that external diffusion of oxygen from the tantalum body is severely impeded if oxygen is present in the atmosphere surrounding the tantalum body, even in small amounts.) After treatment for the desired durations, the remaining rod specimens were analyzed for oxygen content.

Referring now to the drawings, and more particularly to FIG. 1, there are illustrated certain observable properties which help to understand the diffusion phenomenon of entrapped oxygen within a tantalum body. The curve represents the rate of diffusion of entrapped oxygen to the surface of the rod specimens after immersion in the molten calcium at the respective time intervals.

As shown, the oxygen content on specimens which had been immersed for 30 minutes had decreased to approximately 1100 p.p.m. Specimens that had been immersed for 1 hour had an average oxygen content of 900 p.p.m. For specimens immersed for 3 hours, the decrease in oxygen became more gradual, as their oxygen content averaged about 600 p.p.m. For those specimens immersed for 6 hours, the oxygen content decreased to an average approximately 400 p.p.m., while specimens immersed as long as 22 hours decreased in oxygen content to 100 p.p.m. Thus between 6 and 22 hours, the diffusion of oxygen from a tantalum body begins to reach a limiting value. The typical value for acceptable commercially available tantalum is approximately 1300 p.p.m. Illustratively, from FIG. 1, it can be seen that the oxygen content of the tantalum specimens employed reached commercially accepted standards in a relatively short time (30 minutes) when employing the aforedescribed invention.

Tantalum bodies having different diameters and variable physical properties, such as varying density, porosity, and grain size, and bodies treated at different temperatures or having variable amounts of entrapped oxygen will require different diffusion times. However, the diffusion curve should follow a substantially constant pattern. Accordingly, it should be made clear that the specific values in the graph of FIG. 1 are merely illustrative and not to be made universal for all tantalum bodies. Rather, the graph is intended to show the general effect of diffusion versus time.

Essentially, the completeness of the deoxidation of a tantalum body is basically dependent upon the time entrapped oxygen is permitted to diffuse to the surface of the tantalum body and react with the molten calcium to form the reaction product of calcium oxide.

EXAMPLES 2–7

A plurality of tantalum anodes were prepared by compacting 10 micron diameter tantalum powder into desired shaped bodies and sintering the bodies under vacuum at a temperature of approximately 2000° C. After sintering, a dielectric film of tantalum pentoxide ($Ta_2O_5$) was formed on the surfaces of the bodies by anodizing the bodies at 125 volts in dilute nitric acid at 65° C. This procedure produced an oxide film thickness on each anodized body of approximately 2000 A. and an average entrapped oxygen content of approximately 6600 p.p.m. The dimension of each anode was approximately 0.5 cm. diameter by 1.1 cm. long.

The anodes were proportionately deposited into six covered iron crucibles which contained 99.9% pure molten calcium, as aforedescribed. Experiments were carried out in varying controlled atmosphere furnaces at temperatures ranging from 900–1100° C. and for times ranging from 30 minutes to 22 hours. The controlled atmospheres used were helium, hydrogen and a mixture of the two gases. These gases were found especially suitable for promoting the phenomena that causes the entrapped oxygen to diffuse to the surface.

After completing the de-oxidation experiments, the tantalum anodes were treated with dilute hydrochloric acid. The acid treatment removed the calcium oxide and any excess calcium from the anodes. The anodes were then ground into powder. (Anodes treated in helium were hydrogenated before grinding.)

The powder specimens were then submitted for chemical analysis. A list of the experiments and the oxygen concentrations obtained in the final specimens is outlined in Table I. Noteworthy is that in each experiment the final oxygen values were lower than a typical value for acceptable commercially available powder (1300 p.p.m.).

TABLE I.—RESULTS OF DEOXIDATION TREATMENTS ON TANTALUM ANODES

| Example Number | Temperature (° C.) | Reaction time (hr.) | Atmosphere | P.p.m. oxygen |
|---|---|---|---|---|
| 2 | 900 | 3½ | 4% H$_2$ in He | 475 |
| 3 | 950 | 3 | H$_2$ | 260 |
| 4 | 1,000 | 1½ | He | 365 |
| 5 | 1,000 | 8½ | H$_2$ | 265 |
| 6 | 1,000 | 16 | H$_2$ | 380 |
| 7 | 1,100 | 2 | H$_2$ | 270 |

EXAMPLE 8

Figure 2:
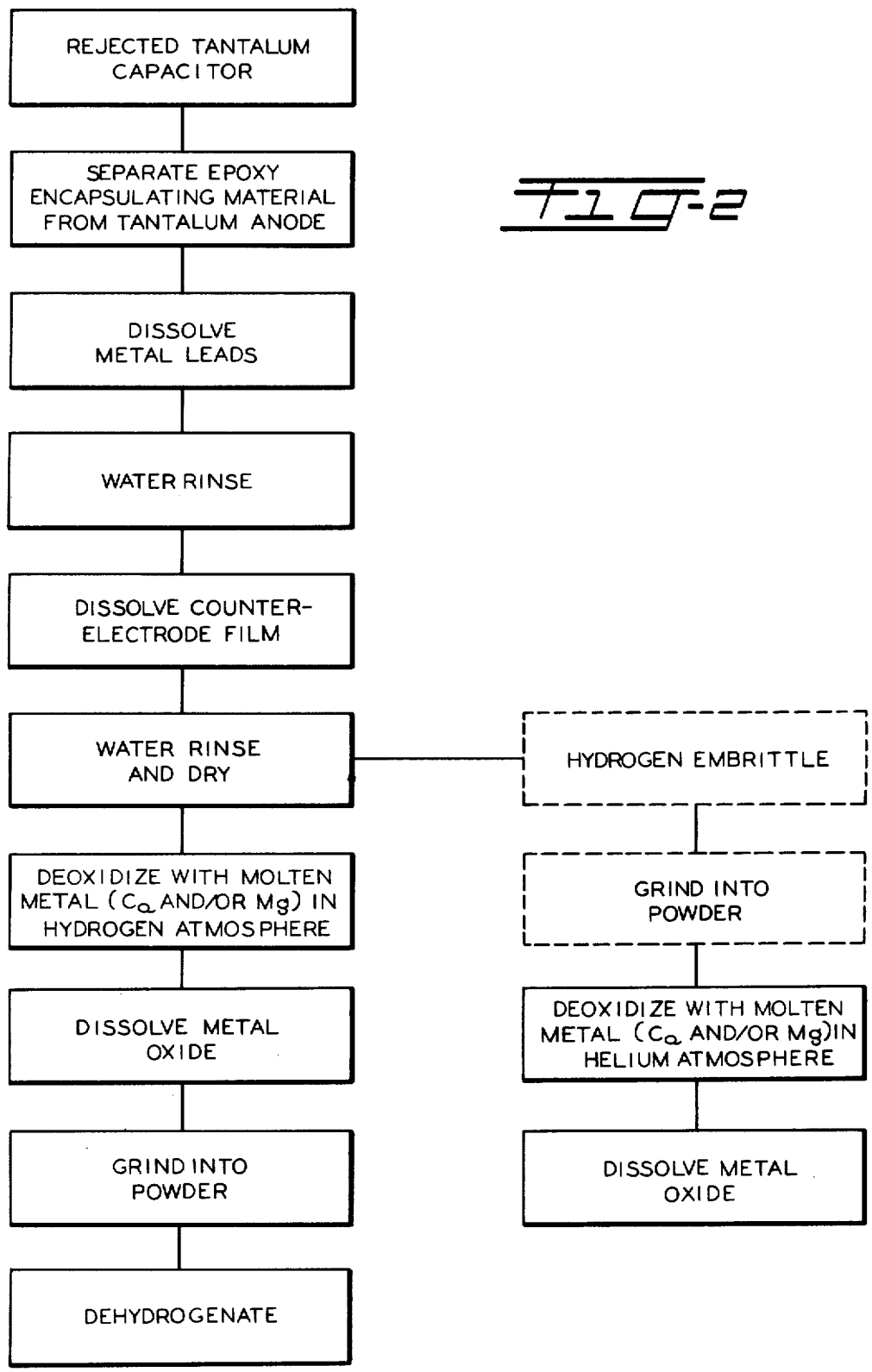
FIG. 2 is a flow chart that schematically illustrates a preferred combination of operations in accordance with the invention.

Approximately one pound of tantalum was recovered from scrap solid tantalum capacitors by the below outlined process. Referring now to FIG. 2, the sequence of steps is illustratively and schematically listed in the flow chart.

The capacitors, which were epoxy molded, were conveyed to a hammermill which shattered the epoxy encapsulate but essentially left the underlying tantalum anodes intact. The epoxy particles and a majority of metal leads which were affixed to the anodes were separated from the anodes by mechanical means. Those remaining metal leads were dissolved in a solution consisting of equal parts of water, hydrochloric acid, and nitric acid.

The thus treated anodes now included a first overlying film of tantalum oxide and a second overlying counter-electrode film consisting of manganese dioxide, graphite and silver. The counter-electrode film was dissolved in a solution of three parts water, two parts hydrogen peroxide, and one part nitric acid. The result tantalum anode was then rinsed and dried. At this stage, the anodes were free of all contaminants except the tantalum oxide film and entrapped oxygen. The oxygen content was estimated to be greater than 6600 p.p.m. The anodes were treated with approximately 0.22 pounds of molten calcium (99.9% pure) at 1000° C. in a hydrogen atmosphere for 8 hours. During this treatment, the oxide film was reduced, and the anodes were both de-oxidized and hydrogen embrittled to a hydrogenated state.

The resulting tantalum bodies were then cooled and the reaction product calcium oxide and any excess calcium were removed by immersing the tantalum bodies in a 20% hydrochloric acid solution. The tantalum bodies were then rinsed in water, dried, and ground into powder.

The powder was de-hydrogenated in helium at 900° C. for one hour. The analysis of the powder revealed an oxygen content of 1288 p.p.m. and no detectable calcium.

A group of tantalum bodies was pressed from the reclaimed powder into anodes and sintered employing conventional techniques. The anodes were employed to make a lot consisting of 90 capacitors rated at 40 microfarads and 20 volts with a process yield of 93%. The capacitors were placed on Life Tests for 1000 hours at 1¼ rated voltage at 85° C. Ninety-two percent survived the Life Test requirements.

Referring back to Example 1, when employing pure helium atmospheres during the calcium treatment step, it is not necessary to hydrogenate the tantalum body. However, if it is desired to grind the tantalum to a powder, the body may be hydrogen embrittled before the calcium reaction, as schematically represented by the broken line representation in FIG. 2. De-hydrogenation of the powder will occur during the subsequent de-oxidation step due to the presence of the helium atmosphere.

While the specific examples described above have been related primarily to the use of calcium as a molten reaction metal, it is to be understood that molten magnesium may also be employed to produce tantalum metals of comparable purity. However, a lower temperature (750–800° C.) must be employed because of the high vapor pressure of magnesium. Correspondingly, longer de-oxidation periods will also have to be employed because the rate of diffusion of the entrapped oxygen to the surface of the tantalum body is slower at the lesser temperature range. The removal of the magnesium oxide reaction product may be expediently accomplished by dissolving out the magnesium oxide and any excess magnesium in acetic or a weak mineral acid solution. Other reactive molten metals which are believed to be satisfactory in the reaction process include the other metals in Group II–A of the Periodic Chart, the metals of Group I–A, the rare earth elements, and aluminum.

Further, while the invention has been specifically directed to removing entrapped oxygen impurities from scrap tantalum, this is not intended to be a limiting feature. Other entrapped impurities, including other gases, carbon, etc., which will diffuse to the surface of the tantalum body at elevated temperatures and react with the molten metals described herein to form easily removable compounds are considered equivalent impurities for the purpose of this disclosure and within the scope thereof. It is to be understood that different materials are apt to have different rates of diffusion, therefore, it would be obvious to determine specific diffusion ranges employing the teaching of this invention.

What is claimed is:

1. In a method for removing impurities from a tantalum body to recover substantially pure tantalum metal, the improvement comprising:
   immersing the tantalum body in an excess amount of molten metal selected from the group consisting of calcium and magnesium at elevated temperatures, and in a non-oxidizing atmosphere for a duration sufficient to permit the impurities to diffuse to the surface and react with the molten metal to form a compound of the molten metal; and
   treating the body with a reagent which is inert to the tantalum, yet dissolves out the metal compound and excess molten metal to recover substantially pure tantalum metal.

2. A method for recovering pure tantalum metal from a rejected tantalum body that has entrapped oxygen interstitially within, comprising the steps of:
   reacting the body with an excess amount of molten metal selected from the group consisting of calcium and magnesium in a nonoxidizing atmosphere at elevated temperatures for a period of time sufficient to permit the entrapped oxygen to diffuse to the surface of the body and react with the molten metal to form a metallic oxide of said molten metal; and
   dissolving the oxide and any excess molten metal from the body to recover a substantially pure tantalum metal body.

3. A method for recovering pure tantalum metal as recited in claim 2 wherein the body is reacted with the molten metal in a helium atmosphere to reduce the oxide film and convert the entrapped oxygen to the metallic oxide.

4. A method for recovering pure tantalum metal as recited in claim 2 wherein the body is reacted with the molten metal in a hydrogen atmosphere to reduce the oxide film and convert the entrapped oxygen to the metallic oxide.

5. A method for recovering pure tantalum metal as recited in claim 2 wherein the body is reacted with the molten metal in a mixed helium-hydrogen atmosphere to reduce the oxide film and convert the entrapped oxygen to the metallic oxide.

6. A method for recovering pure tantalum metal as recited in claim 2 wherein the body is reacted with excess molten calcium to convert the oxygen to calcium oxide.

7. A method for recovering pure tantalum metal as recited in claim 6 wherein the body is washed in a dilute solution of hydrochloric acid to dissolve the calcium oxide and excess molten calcium from the tantalum body.

8. In a method for reclaiming pure tantalum metal from a scrap epoxy encapsulated tantalum capacitor, having metal leads thereon, the steps comprising:
    separating the epoxy encapsulant from the capacitor to expose a tantalum anode which has a first overlying anodized film, a second overlying counter-electrode film, and entrapped oxygen interstitially within;
    immersing the anode in a first solvent to dissolve the metal leads therefrom;
    immersing the anode in a second solvent to dissolve the counter-electrode film therefrom;
    immersing the anode in a molten metal selected from the group consisting of calcium and magnesium at an elevated temperature in a non-oxidizing atmosphere for a period of time to reduce the anodizing film to an oxide of the molten metal and diffuse the entrapped oxygen within the anode to the surface of the anode and react with the molten metal, to form an oxide of the molten metal; and
    immersing the anode in a third solvent to dissolve out the metal oxide and convert the anode to a substantially pure tantalum metal body.

9. A method for reclaiming pure tantalum metal as recited in claim 8 wherein the anode is immersed in a first solvent consisting of equal parts of water, hydrochloric acid and nitric acid to dissolve the metal leads therefrom.

10. A method for reclaiming pure tantalum metal as recited in claim 8 wherein the anode is immersed in a solution consisting of water, hydrogen peroxide, and nitric acid to remove the counter-electrode film therefrom.

11. A method for reclaiming pure tantalum metal as recited in claim 8 wherein the tantalum body is immersed in the molten metal for a duration in the range of between thirty minutes and twenty-two hours.

12. A method for reclaiming pure tantalum metal as recited in claim 11 wherein the tantalum body is immersed in the molten metal for a time in the range of between eight and nine hours.

13. A method as recited in claim 8 wherein the anode is immersed in the molten metal in a helium atmosphere to reduce the anodized film and convert the entrapped oxygen to the metal oxide.

14. A method as recited in claim 8 wherein the anode is immersed in the molten metal in a hydrogen atmosphere to reduce the anodized film and convert the entrapped oxygen to the metal oxide.

15. A method as recited in claim 8 wherein the anode is immersed in the molten metal in a mixed helium-hydrogen atmosphere to reduce the anodized film and convert the entrapped oxygen to the metal oxide.

16. A method for reclaiming pure tantalum metal powder from a scrap epoxy encapsulated tantalum capacitor having metal leads thereon, the steps comprising:
    crushing and separating the epoxy from the capacitor to expose a tantalum anode which has a first overlying film of tantalum oxide, a second overlying film of a counter-electrode, and excess entrapped oxygen interstitially within;
    immersing the anode in a first solvent consisting of equal parts of water, hydrochloric acid and nitric acid to dissolve the metal leads thereon;
    immersing the anode in a second solvent consisting of three parts water, two parts hydrogen peroxide and one part nitric acid to dissolve the counter-electrode film thereon;
    immersing the anode in 99.9% pure molten calcium at 1000° C. in a hydrogen atmosphere for eight hours to embrittle the anode and reduce the oxide film thereon and diffuse the entrapped oxygen to the surface of the anode which reacts with the molten calcium to form calcium oxide;
    immersing the anode in a third solvent consisting of a 20% hydrochloric acid solution to dissolve out the calcium oxide and convert the anode to a substantially pure tantalum body;
    grinding the tantalum body into a powder; and
    dehydrogenating the tantalum powder in a helium atmosphere at 900° C. for one hour to produce a pure tantalum metal powder.

References Cited

UNITED STATES PATENTS

| | | | |
|---|---|---|---|
| 2,287,771 | 6/1942 | Alexander | 75—0.5 BB |
| 2,584,411 | 2/1952 | Alexander | 75—84 X |
| 2,753,255 | 7/1956 | Alexander et al. | 75—0.5 BB X |
| 2,848,313 | 8/1958 | Takahashi et al. | 75—0.5 BB |
| 2,905,549 | 9/1959 | Taylor et al. | 75—84 |
| 2,950,185 | 8/1960 | Hellier et al. | 75—0.5 BB |
| 3,180,711 | 4/1965 | Aconsky | 75—0.5 BB X |
| 3,295,951 | 1/1967 | Fincham et al. | 75—84 X |
| 3,415,639 | 12/1968 | Daendliker et al. | 75—0.5 BB |
| 3,184,302 | 5/1965 | Chindgren | 75—84 |

FOREIGN PATENTS

| | | | |
|---|---|---|---|
| 657,781 | 2/1963 | Canada | 75—0.5 R |

L. DEWAYNE RUTLEDGE, Primary Examiner

G. K. WHITE, Assistant Examiner

U.S. Cl. X.R.

75—0.5 BB, 84; 148—13.1, 126; 134—3